(12) United States Patent
Mallenahalli et al.

(10) Patent No.: US 6,392,193 B1
(45) Date of Patent: May 21, 2002

(54) SINGLE SIDE GIRTH WELDING APPARATUS AND METHOD

(75) Inventors: Pradeepkumar Kirshan Mallenahalli, Broussard; Dale J. Castille, Lafayette, both of LA (US)

(73) Assignee: Frank's Casing Crew and Rental Tools, Inc., Lafayette, LA (US)

( * ) Notice: Subject to any disclaimer, the term of this patent is extended or adjusted under 35 U.S.C. 154(b) by 0 days.

(21) Appl. No.: 09/374,753

(22) Filed: Aug. 13, 1999

Related U.S. Application Data
(60) Provisional application No. 60/132,091, filed on Apr. 30, 1999.

(51) Int. Cl.$^7$ .............................................. B23K 9/095
(52) U.S. Cl. ................................... 219/130.01; 219/61
(58) Field of Search ........................ 219/61, 60 R, 219/60 A, 124.34, 125.11, 130.01, 130.21, 137 R; 228/219

(56) References Cited

U.S. PATENT DOCUMENTS

| | | | |
|---|---|---|---|
| 2,747,065 A | * | 5/1956 | Diehl ........................... 219/61 |
| 3,335,254 A | * | 8/1967 | Vilkas et al. ........... 219/130.21 |
| 3,338,499 A | * | 8/1967 | Gilbert ........................ 228/219 |
| 3,702,915 A | * | 11/1972 | Vilkas et al. ........... 219/137 R |
| 3,974,356 A | | 8/1976 | Nelson et al. |
| 4,283,617 A | * | 8/1981 | Merrick et al. ............... 219/61 |
| 4,465,220 A | | 8/1984 | Ledlow et al. |
| 4,523,076 A | | 6/1985 | Laymon |
| 4,724,302 A | * | 2/1988 | Penney et al. ......... 219/130.21 |
| 4,920,249 A | * | 4/1990 | McLaughlin et al. .. 219/124.34 |
| 5,104,152 A | | 4/1992 | Galfant |
| 5,401,933 A | | 3/1995 | Yoneda |
| 5,435,478 A | * | 7/1995 | Wood et al. ............... 219/60 R |
| 5,581,037 A | | 12/1996 | Kwun |
| 5,992,897 A | | 11/1999 | Hill |

FOREIGN PATENT DOCUMENTS

| JP | 58-159981 | * | 9/1983 | ............. 219/137 R |
|---|---|---|---|---|

* cited by examiner

*Primary Examiner*—Clifford C. Shaw
(74) *Attorney, Agent, or Firm*—The Matthews Firm

(57) ABSTRACT

The present invention provides an apparatus and method for achieving single-sided girth welds which adapt to and compensate for inherent geometrically induced difficulties in single-side girth welding applications. The inherent geometrically induced difficulties include those caused by axial misalignment, angular misalignment, and mismatched ovality. The present invention's apparatus and method minimize root defects due to undercut, incomplete penetration, excess penetration, or lack of fusion. The present invention provides accordingly limits defects introduced during the welding process and thus limiting fatigue failures. The present invention does not require the use of backing strips. The present invention further utilizes an improved lineup clamp for use in single-sided girth welding which does not cause damage to the interior of the pipes being welded. A test apparatus and method for achieving full visual non-destructive testing of single-sided girth welds produced by the present invention's apparatus and method is also provided.

25 Claims, 10 Drawing Sheets

SINGLE SIDE GIRTH WELDING APPARATUS AND METHOD

RELATED APPLICATIONS

The present invention claims priority from United States of America Provisional Patent Application 60/132,091, filed Apr. 30, 1999 for "Single Side Girth Welding Apparatus and Method".

TECHNICAL FIELD

The present invention relates to devices and methods for single-sided girth welding. The present invention especially relates to single sided girth welding pipes and tubulars which will be subjected to extreme fatigue conditions.

BACKGROUND ART

Single-sided girth welding is used extensively in the fabrication of offshore structures, particularly in risers, which are long sections of pipe. In single side welding, the root, hot, and fill passes are all typically made from the outside of the pipe due to lack of access to or from the inside of the pipe. In addition to lack of access, other factors that cause unacceptable weld profiles include differences in pipe ovality and axial and angular misalignment during fit-up. These geometrically induced difficulties generate unacceptable weld profiles and characteristics which are the main cause of fatigue failures. Accordingly, full penetration welds made from both sides of the pieces to be joined, as opposed to from a single side, are usually recommended in the current art.

In recent years, a number of fatigue failures in single-sided joints (those created with single-sided welding methods) have occurred, mainly caused by fatigue crack initiation at the root of the weld. A root pass in a weld is the first pass performed during the welding operation. Fatigue failure of single-sided welds is a significant problem as cracks initiate and propagate from the root pass on the inner diameter. The principal types of root discontinuities are those due to undercut, incomplete penetration, excess penetration, lack of fusion, or abrupt geometric changes at the junction of the weld and the base material. FIG. 1, a cross-section view of a series of defective welds, demonstrates several types of these defects including undercut defects 1a, incomplete penetration defects 1b, excess penetration defects 1c, and internal concavity or suck back defects 1d. In some installations, backing strips have been used during fabrication of single-sided joints. Generally, backing strips are inserted, bolted, and fitted into the joint interior and welded into place. Backing strips add complexity and cost to welding.

Girth welding is a welding operation where circumferential welds are made between two components. A problem with most girth welded welds is that fatigue failures occur caused in part by an inability to adequately test and inspect the weld by conventional means. Inadequate testing is a problem because conventional testing methods do not reveal the contour or shape of the weld bead in the inner diameter.

Another problem with current single sided girth welding methods is that current art lineup clamps can cause damage to the interior of the pieces being welded, in part because the lineup clamp does not adequately shield against abrasion during insertion and removal of the lineup clamp from the interior of the pieces to be welded. Accordingly, bare metal or other abrasive materials on the lineup clamp can scratch or otherwise damage the interior of the pieces when the lineup clamp is inserted or removed.

Because the potential for root defects in single-sided welds is high, reliable and appropriate non-destructive testing (NDE) procedures are of particular concern. Root defect detection is normally difficult because the normal inspection methods are available only from the outside of the weld area. Most NDE testing includes magnetic particle inspection testing (MT), ultrasonic testing (UT), and/or radiographic testing (RT), but desirable visual inspection of the intrusion of the weld into the interior is difficult.

When riser joints are used underwater, as in deep sea or other offshore wells, wave motions and water currents subject the riser joints to oscillations and cyclic forces, leading to fatigue failure with the cracks typically initiating from the toe of the weld on the inner diameter.

It is therefore an object of the present invention to provide an improved welding apparatus and method, capable of creating and testing single-sided girth welds that are highly fatigue resistant. Accordingly, an apparatus and method for achieving and testing single-sided girth welds which adapt to and compensate for inherent geometrically induced anomalies, such as axial misalignment, angular misalignment, and ovality, which limits defects introduced during the welding process and thus limits fatigue failures is described.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

GENERAL DESCRIPTION AND EXEMPLARY MODE FOR CARRYING OUT THE INVENTION

The present invention relates generally to welding pipes such as those used in the oil and gas industry. More specifically, the present invention relates to creation of girth welds, welds which are created from the exterior of the pieces being welded.

Figure 1:
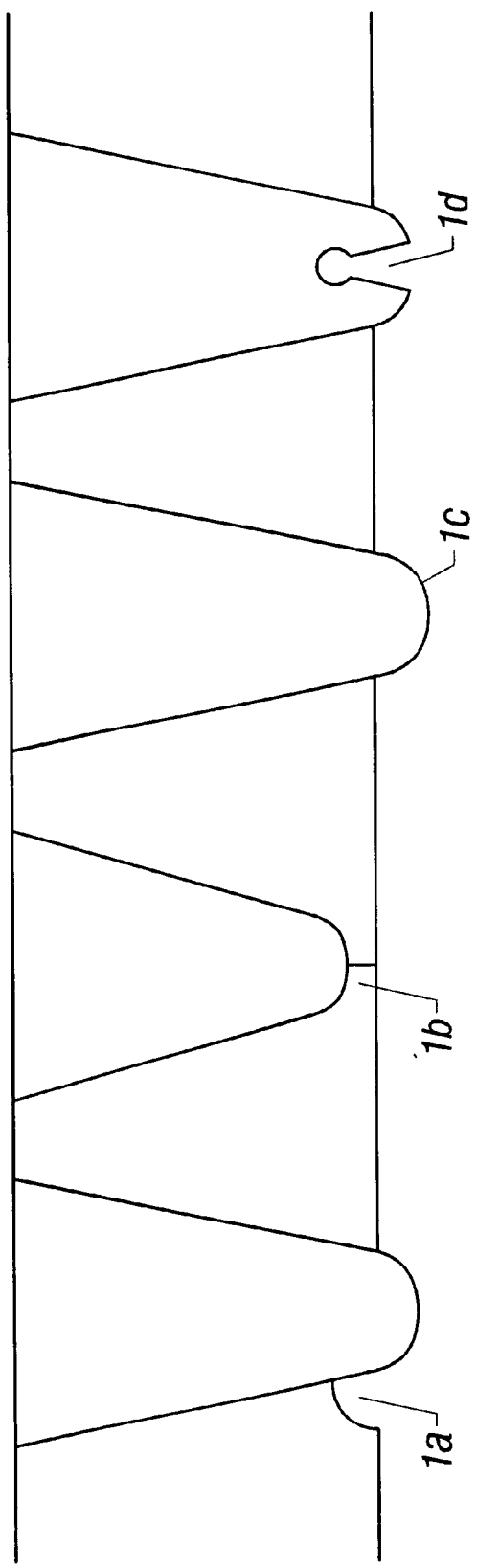
FIG. 1 is a cross-sectional view of a series of welds demonstrating different weld defects.
Figure 2:
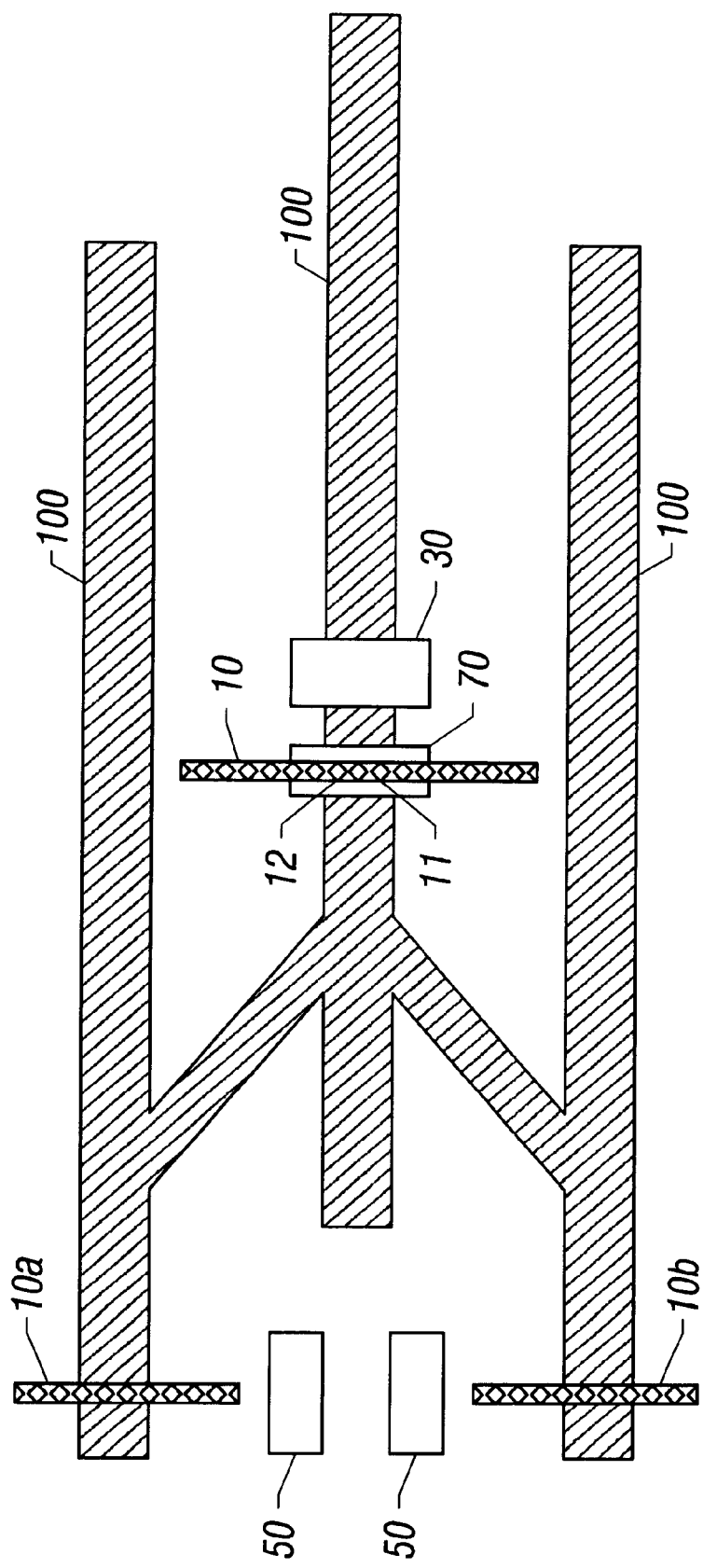
FIG. 2 is a general block diagram of the present invention.

Referring now to FIG. 2, a general block diagram of the present invention, the present invention may be used for welding continuous strings of pipes together as well as the fabrication of specialized joints of pipes which are mechanically joined into continuous strings such as pipe risers. As those familiar with the art will understand, a string of pipe, such as a pipe riser, may be formed as in the present invention by welding two or more pipes together, or in the case of a pipe riser joint by welding a box to one end of a first pipe, a pin to one end of a second pipe, and then welding the first pipe to the second pipe at their respective non-welded ends, where "box" and "pin" are terms of art meaning specialized pipe components well understood by those skilled in the art. The present invention's improved pipe welding assembly generally comprises one or more beveling stations 50, one or more welding stations 30, one or more welding cradles 70, and one or more improved lineup clamps 20 (not shown in the figure).

Additionally, the present invention may further comprise conveyor assemblies 100 which allow transportation of pieces 10a and 10b to be welded(hereinafter, generally referred to as pieces 10) between the various components of the present invention's welding apparatus, accordingly permitting the welding to be completed with minimal unnecessary movement.

Figure 3:
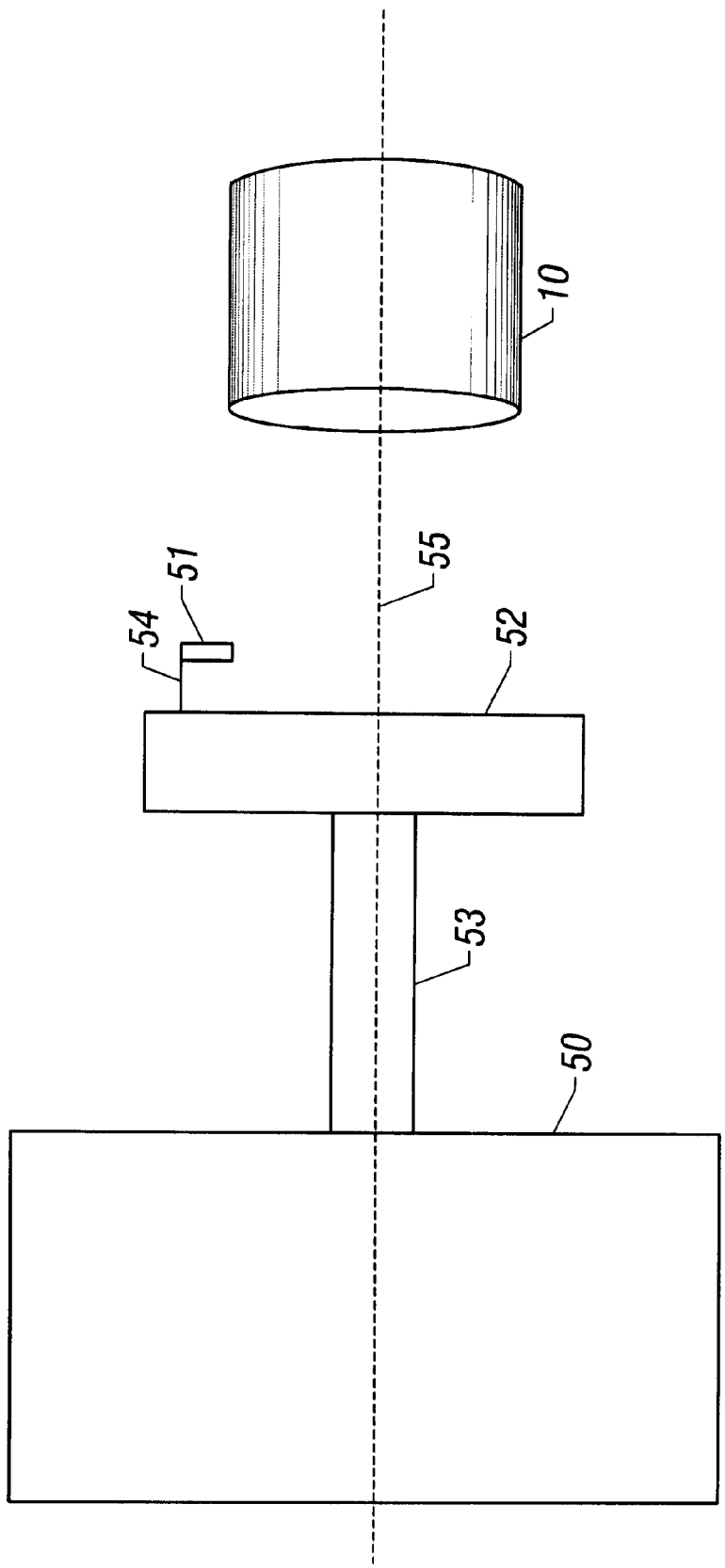
FIG. 3 is a perspective view of size adjustable beveling station.

Referring now to FIG. 3, a perspective view of size adjustable beveling station 50, although pieces 10 to be welded may be manufactured to tight dimensional tolerances with respect to ovality and nominal diameter, resulting in a good fit-up prior to welding, adaptation for minor mismatches in ovality and nominal diameter may be accomplished at beveling station 50. Size adjustable beveling station 50 comprises beveling head 51 attached to offset biaser 54 which may be mounted on collar 52 which itself may be mounted on rotation assembly 53. Offset biaser 54 maintains beveling head 51 at a constant radial offset from central axis 55 of the end of the piece 10 to be welded. In one embodiment, offset biaser 54 is a spring loaded arm which biases beveling head 51 against piece 10 to be welded. Offset biaser 54 allows beveling head 51 to "float" against piece 10 to be welded as the beveling occurs, maintaining a constant radial offset from piece 10 to be welded even if that piece is less than perfectly circular, thus insuring that the required beveled edge thickness is maintained. To bevel an end of piece 10 to be welded into the present invention's desired half-concave channel bevel, more or less the shape of a sans serif "J", piece 10 to be welded is aligned along central axis 55 and abutted against collar 52 attached to or integral with rotation assembly 53. Beveling then occurs by rotating beveling head 51 relative to piece 10, or rotating piece 10 relative to beveling head 51.

Figure 4:
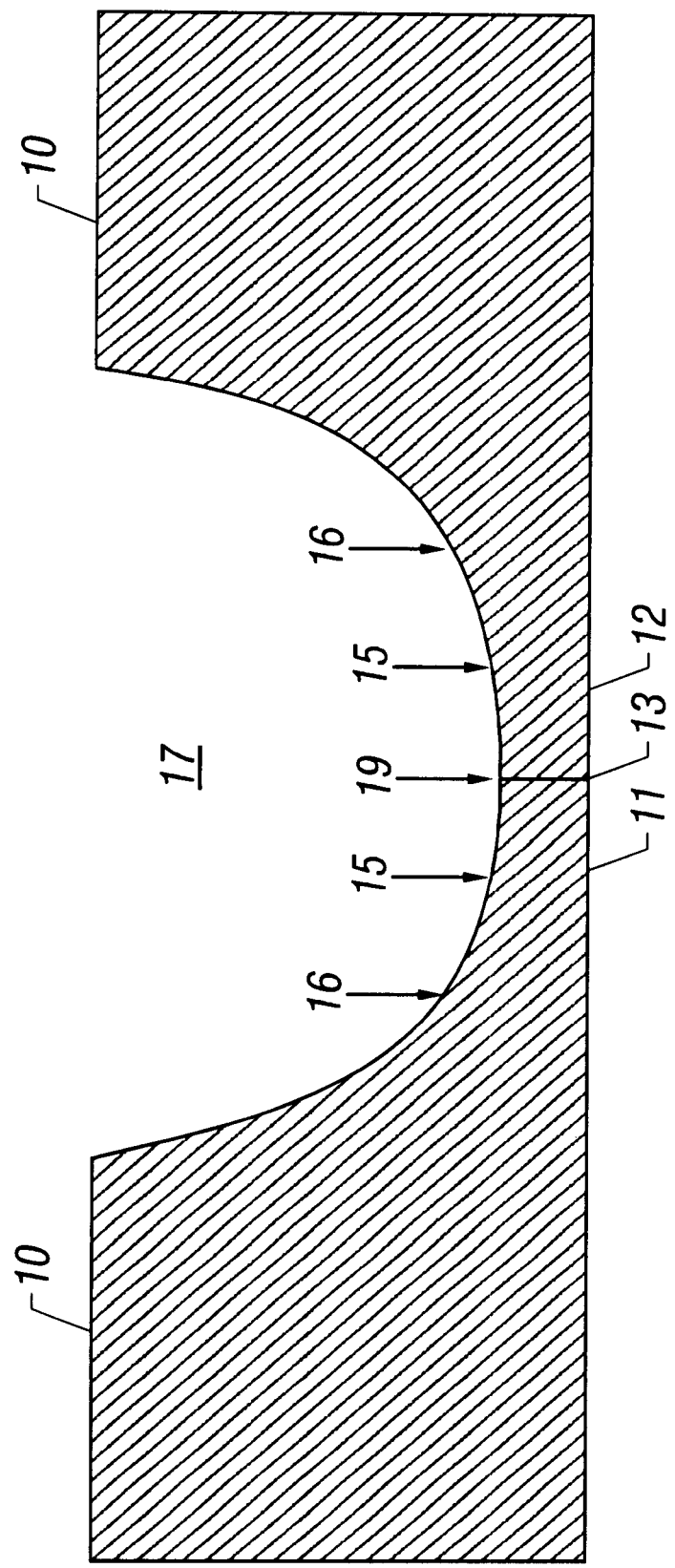
FIG. 4 is a cross-sectional view of two pieces to be welded abutted and aligned at their beveled edges.

Referring now to FIG. 4, a cross-sectional view of two pieces 10 to be welded to be aligned at their beveled edges 11 and 12, the present invention's improved welding method describes beveling, at beveling station 50 (not shown in FIG. 3), one or both edges of pieces 10 to be welded into a shape having a land extension 15 near the interior of piece 10 to be welded and a curved distal portion, shown as curvature angle 16, which rises to the exterior of piece 10 to be welded, thus approximating a sans serif letter "J". Each of the beveled ends 11 and 12 may be inspected after beveling to insure that the present invention's desired concave bevel is within tolerances. Accordingly, edges 11 and 12, when aligned opposite each other, form a concave welding channel 17 the nadir 19 of which is at welding junction 13, toward the interior of pieces 10 to be welded. In a preferred embodiment, the thickness of each land extension 15 at welding junction 13 is typically 0.060" but can range from 0.055" to 0.065" for pieces 10 to be welded with diameters less than 15". Curvature angle 16 as measured from land extension 15 to the top of piece 10 to be welded typically has a ⅛" radius. These dimensions are not absolute, but the thickness of welding junction 13, contour 16, and land extensions 15 must be of sufficient dimension to provide for a weld that smoothly blends into the base metal on either side on the inner diameter of the pieces 10 being welded. The thickness of welding junction 13 may be verified prior to welding. Contour 15 and land extensions 15 may also be verified, with typical measurements of 0.210" plus or minus 0.005" for a welding junction 13 thickness of 0.065".

Figure 5:
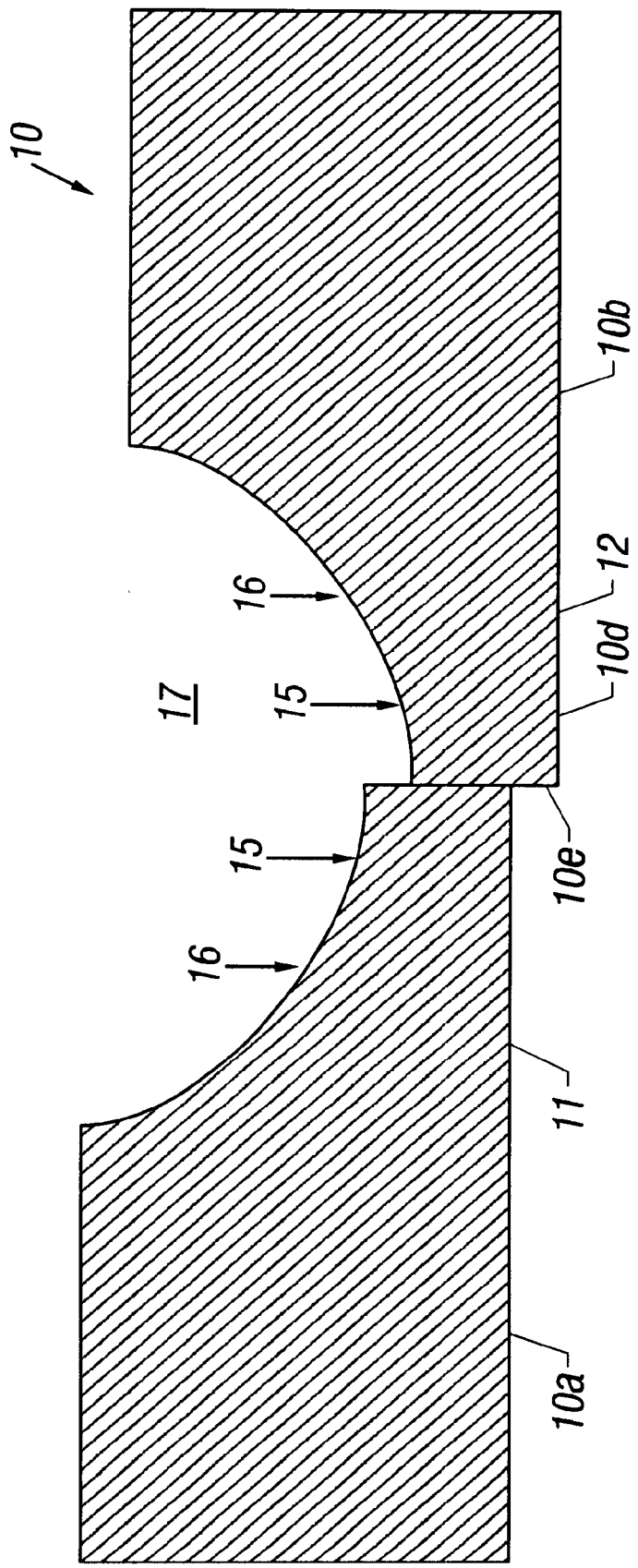
FIG. 5 is a cross-section view of misaligned pieces to be welded.

Referring now to FIG. 5, a cross-section view of misaligned pieces 10 to be welded, the present invention's beveling process accommodates variations in the ovality of pieces 10 to produce substantially uniform thickness and width at land extension 15. Once beveled, pieces 10 to be welded are aligned laterally and longitudinally about a common central axis using an improved lineup clamp 20 (not shown in FIG. 5). Lineup clamp 20 aligns pieces 10 to be welded substantially concentrically whereby the overlap between their respective beveled edges is minimized. Overlap, such as that caused when two pieces are not congruently oval or circular, as shown in FIG. 5 as edge 10e, is kept to a minimum.

Figure 6:
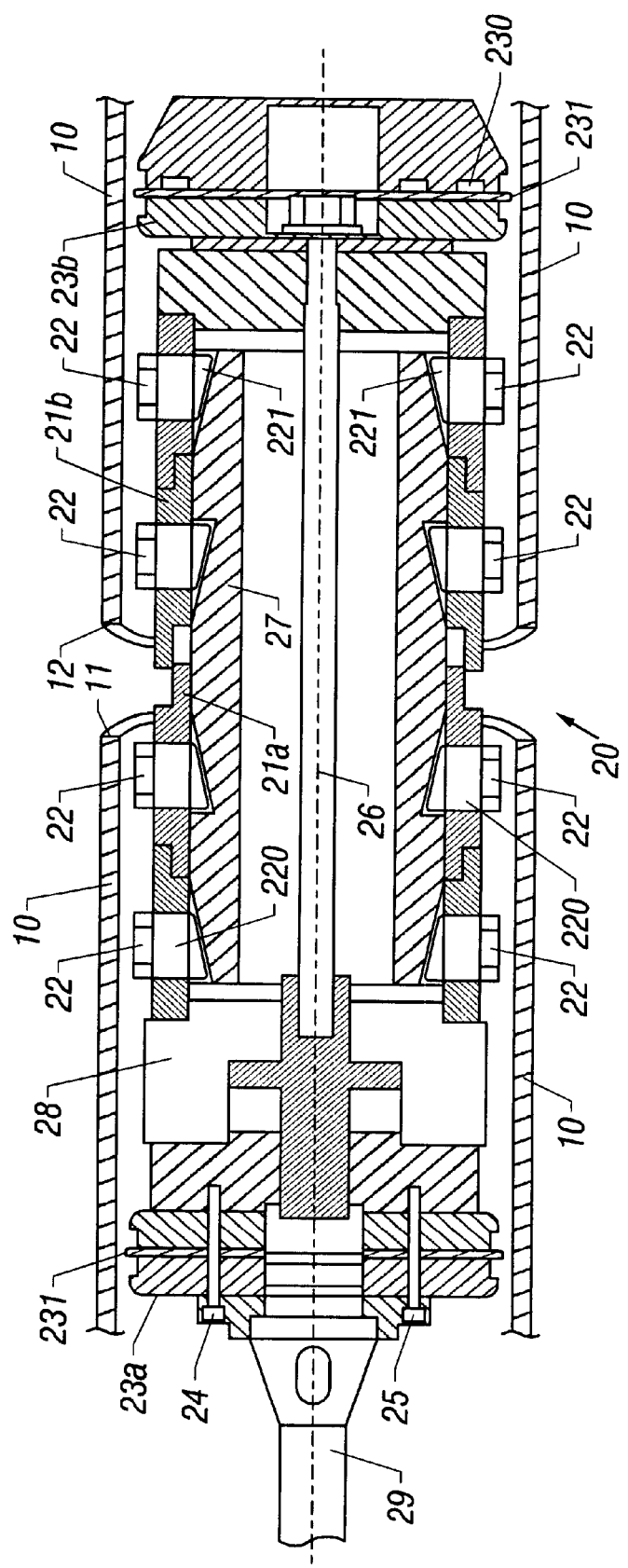
FIG. 6 is a cut-away perspective of improved lineup clamp.

Referring now to FIG. 6, a cut-away perspective of improved lineup clamp 20, the present invention's improved lineup clamp 20 may be used to align pieces 10 to be welded at edges 11 and 12 about common central axis defined by housing axis 26; align pieces 10 to be welded together at edges 11 and 12 to provide welding junction 17 (not shown in FIG. 6) required by the present invention; and provide an appropriate atmosphere for welding. The present invention's lineup clamp 20 is comprised of housing 27 which may be cylindrical. Although a single sleeve 21 may be used, in the preferred embodiment two or more sleeves such as sleeve 21a and sleeve 21b, generally referred to herein as sleeve 21, are axially displaced about housing 27. Dams 23a and 23b, generally referred to herein as dam 23, are disposed about housing 27, and may be positioned at or near each end of housing 27. Each dam 23 may additionally include a flexible washer or ring 231 displaced concentrically about dam 23 to provide an occlusive, airtight seal between lineup clamp 20 and the inner surface of pieces 10 to be welded. Inert gas such as Argon may be used as an atmospheric shield inside pieces being welded 10, preventing oxidation of that portion of root bead weld 40 (not shown in FIG. 6) which projects into the interior of pieces being welded 10. To provide for such an atmosphere, purge dam 23c (not shown in FIG. 6), the area bounded by dams 23a and 23b, housing 27, and the inner surface of pieces 10 to be welded, keeps gas or fluids contained inside purge dam 23c and prevents air, other gases, or fluids from intruding into welding channel 17 (not shown in FIG. 6) from outside purge dam 23c.

In a preferred embodiment, purging fluids or gasses may enter purge dam 23c through purge port 25 to purge the environmental air out from purge dam 23c through exhaust ports 230 in dam 23b, the most distal dam 23 from that end of lineup clamp 20 attached to lance 29, prior to commencement of the present invention's welding operations. In a preferred embodiment, exhaust ports 230 may be integral with flexible washer or ring 231. Although a single exhaust port 230 may be used, in a preferred embodiment four exhaust ports 230 are located at ninety degree intervals circumferentially about dam 23b.

Referring still to FIG. 6, a plurality of biasers 22 are in communication with the inner surface of pieces 10 to be welded. In a preferred embodiment, biaser 22 comprises shoes in communication with biasing ramps 221 that extend radially from housing 27 through apertures 220 in sleeve 21 to bias lineup clamp 20 against the interior of pieces 10 to be welded into which lineup clamp 20 has been stabbed. In one embodiment, coaxial movement of sleeve 21 along housing axis 26 forces one or more sets of biasers 22 radially outward from lineup clamp 20 through aperture 220 along biasing ramps 221 relative to housing axis 26. In an alternative embodiment, biaser 22 may also be spring biased outwardly from housing 27 through aperture 220 to allow for variances in the interior diameters of pieces 10 to be welded. Where two or more sleeves are present, sleeve 21a and sleeve 21b may approach each other coaxially relative to housing axis 26 after sleeve 21a and sleeve 21b have been biased against pieces 10 to be welded. Sleeve 21 may be hydraulically engaged by hydraulic fluids entering through hydraulic entry port 24, or by a piston (not shown in FIG. 6). Use of lineup clamp 20 for aligning pieces 10 to be welded also facilitates keeping all these pieces aligned with respect to each other along the common center axis of the entire assembly, as defined by cylindrical core axis 26, during the welding process. The movement of sleeve 21, biased against pieces 10 to be welded, causes pieces 10 to be welded to align laterally and longitudinally at their respective welding junctions 13 (not shown in FIG. 6) along housing axis 26 in such a way as to maintain alignment of pieces 10 to be welded about a central axis defined by housing axis 26, thus creating welding junction 13.

An important feature of improved lineup clamp 20 is bushing 28 positioned at one end of lineup clamp 20 between sleeve 21a and dam 23 nearest that end. Bushing 28 is constructed of a material softer than piece 10 to be welded. In a preferred embodiment, bushing 28 is made of a polypropylene or other plastic material. This softer material yields when it comes into contact against piece 10 to be welded, thus aiding in preventing scarring of the inner diameter of piece 10 to be welded into which lineup clamp 20 has been stabbed when inserting or withdrawing lineup clamp 20 from that piece.

Figure 7:
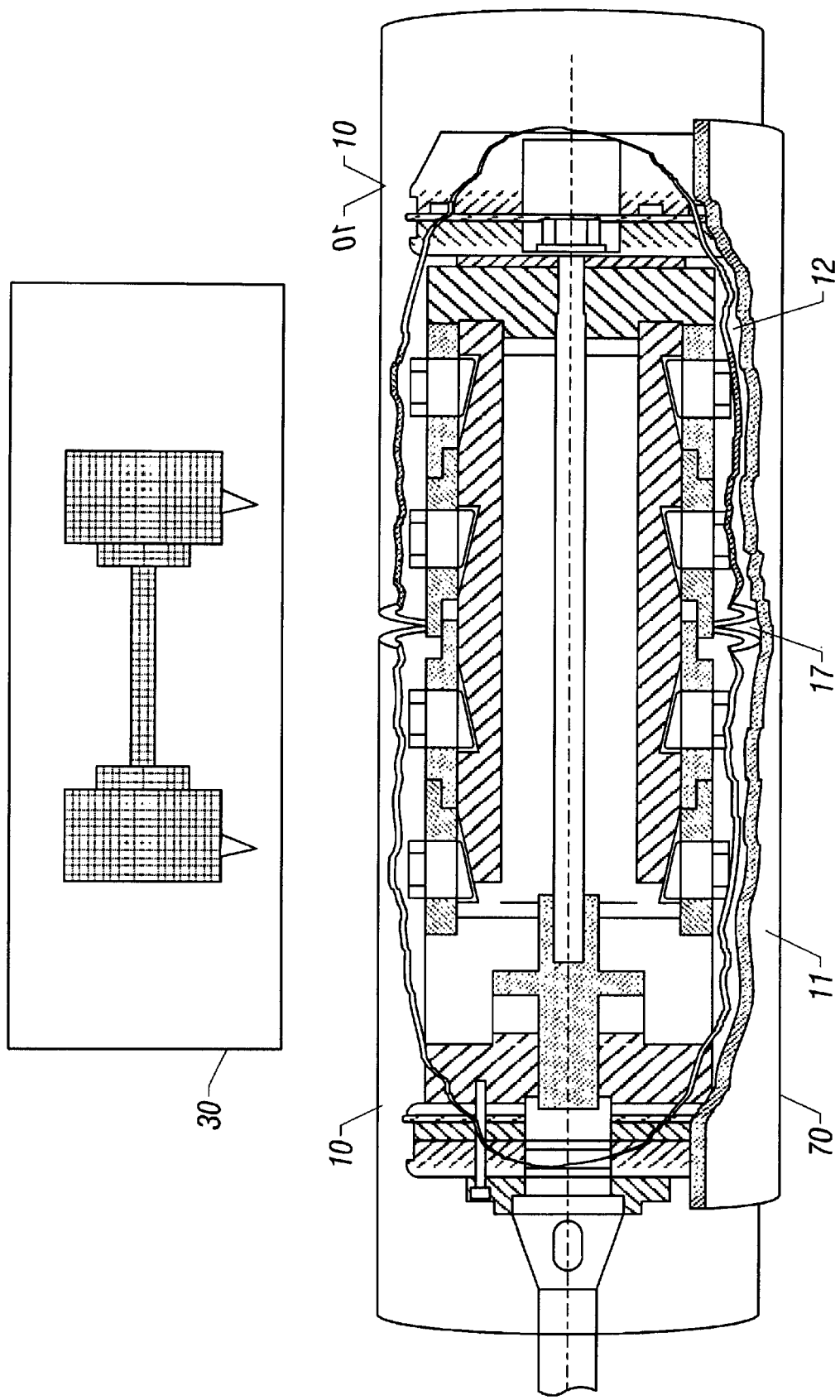
FIG. 7 is a perspective view of welding station showing rotatable assembly carrier.

Referring now to FIG. 7, a perspective view of welding station 30 showing rotatable assembly carrier 70, rotatable assembly carrier 70 is located proximate to welding station 30 and may receive pieces 10 to be welded, once beveled, such that welding station 30 is more-or-less directly overhead rotatable assembly carrier 70. In a preferred embodiment, rotatable assembly carrier 70 is used to rotate welding channel 17 underneath welding station 30. In a preferred embodiment, rotatable assembly carrier 70 has its rotation speed constantly monitored using a closed feedback loop to insure appropriate, constant rotation speed. Use of rotatable assembly carrier 70 further limits the movement of pieces 10 to be welded to a single axis as they are welded, helping insure a more precise, uniform weld. In a preferred embodiment, the entire rotatable assembly carrier 70 may also be raised or lowered, thus enabling easier handling of pieces 10 to be welded onto and off of welding station 30.

Figure 8:
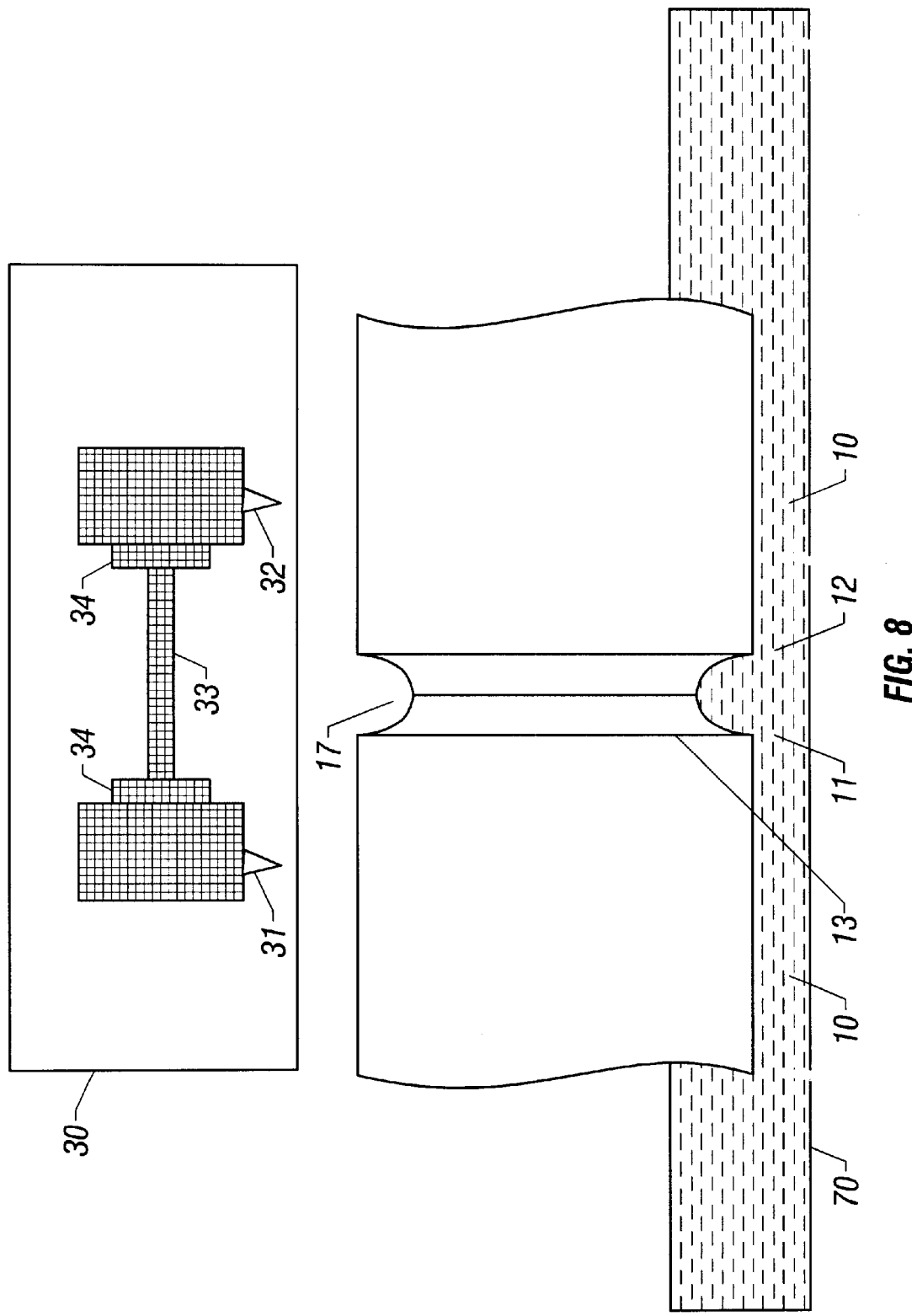
FIG. 8 is a perspective view of welding station

Referring now to FIG. 8, a perspective view of welding station 30, once aligned, beveled ends 11 and 12 are welded at one or more welding stations 30. In a preferred embodiment for riser joint fabrication, three different welding stations 30 may be used, allowing a complete riser joint to be fabricated with minimal handling and moving of the riser joint components. Although located at different physical locations in the preferred embodiment, each of these three different welding stations 30 is substantially identical to the other welding stations 30 and allows each of welded junctions 13 to be welded in a substantially identical manner.

The ability to lay down root bead weld 40 (not shown in FIG. 8) and overlapping welds 43 (not shown in FIG. 8) at the same welding station 30 with a minimum of movement of pieces 10 to be welded provides more accurate welds. In order to limit undesired movement of pieces 10 to be welded closer to and/or away from welding station 30, which would result in a loss of uniformity about the weld, two different welding devices, welding device 31 and welding device 32, may be used and may be located proximate to each other at welding station 30. Each of welding devices 31 and 32 may be attached to an attachment arm 33 which can move in two dimensions. In its first dimension attachment arm 33 allows lowering and raising of welding devices 31 or 32 relative to welding channel 17, and in the second dimension attachment arm 33 allows individually positioning each of welding devices 31 and 32 proximate to welding junction 13.

In a preferred embodiment, each of the two welding devices 31 and 32 may be positioned as required by the present invention's welding method, described herein below, to accomplish the weld as pieces 10 to be welded are rotated underneath lowered welding device 31 or 32 in rotatable assembly carrier 70. To raise and lower welding devices 31 and 32, positioners 34 may be attached to each welding device 31 and 32, one per welding device, to precisely control the offset distance of welding device 31 or 32 from welding junction 13 in welding channel 17. Positioners 34 may be motorized arms controlled by a feedback loop to maintain a precise offset distance.

First welding device 31 may be a gas tungsten arc welding (GTAW) device, as in the preferred embodiment. It is important that first welding device 31 maintain a constant offset from welding channel 17 in order to maintain a consistent weld in all three dimensions. In the preferred embodiment, welding device 32 is a gas metal arc welding (GMAW) head with a manganese tip.

Figure 9:
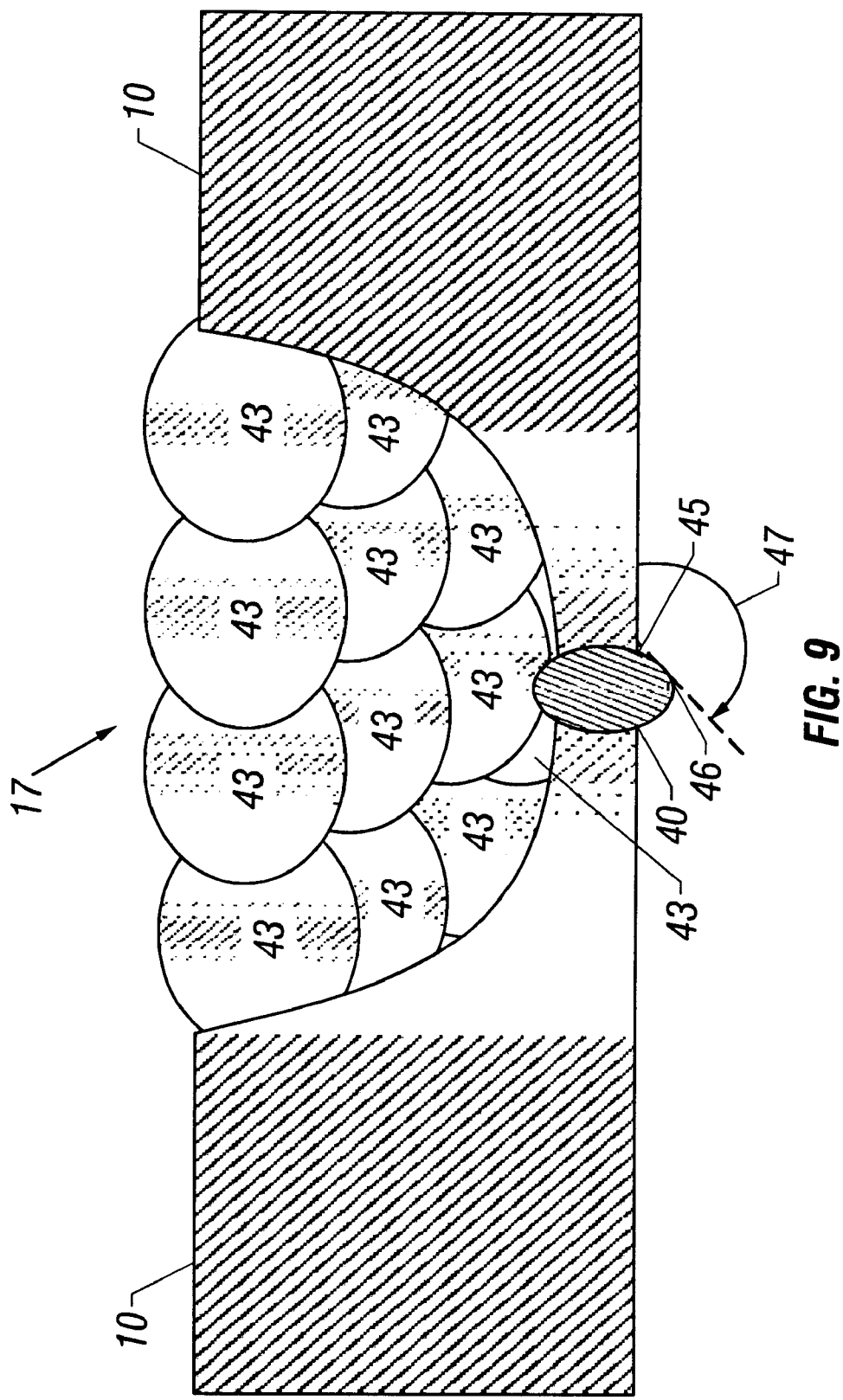
FIG. 9 is a cross-sectional view of a completed weld.

Referring now to FIG. 9, a cross-sectional view of a completed weld, welding device 31 (not shown in FIG. 9), the first to be used in the present invention's welding method, lays down an initial weld, or root bead weld 40, in a single, continuous pass in welding channel 17. Root bead weld 40 also defines reentry angle 47 which is the angle measured from intrusion point 45 to deepest penetration point 46.

After root bead weld 40 is welded, welding device 32 (not shown in FIG. 9) may create one or more overlapping welds 43 in welding channel 17 above root bead weld 40, filling in welding channel 17 with "fill/cap" welds 43. After fill/cap welds 43 are completed, fill/cap welds' 43 outer protrusions may be ground such that there is a minimal amount of weld reinforcement remaining, no undercut, and no remaining concavity.

Figure 10:
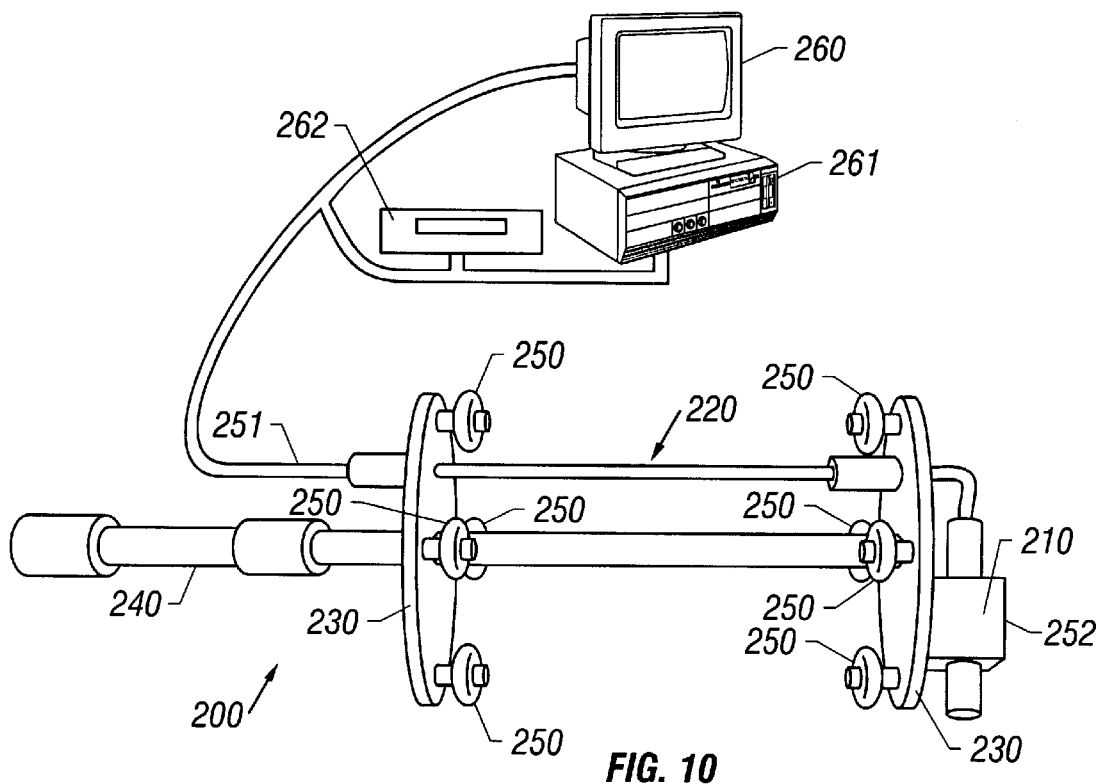
FIG. 10 is a perspective view of a video probe.

Referring now to FIG. 10, a perspective view of a video probe, video probe, generally referred to with the numeral "200," allows visual inspection and testing of the interior of pieces 10 to be welded. Video probe 200 is comprised of video camera 210 mounted to video probe pig 220 where video probe pig 220 is sized to fit inside pieces 10 to be welded. In all configurations and embodiments, the video image from video camera 210 may be magnified. Video camera 210 can be rotatably mounted to video probe 200 or fixedly attached to video probe pig 220. It is important that video camera 210 is mounted in such a manner as to attain and maintain a true perpendicular relationship to the inner surface of pieces 10 to be welded as defined by video camera 210 radially from the center axis of pieces 10 to be welded. Illumination source 252 may be provided to illuminate the area within video camera's 210 focus area.

In a preferred embodiment video probe pig 220 is comprised of one or more circular plates 230 sized to fit within pieces 10 to be welded and fitted with one or more biasing arms 250. Pig lance 240 is mounted to the center of circular plates 230. Pig lance 240 may be manipulated manually or automatically to maneuver video probe 200 through the interior of pieces 10 to be welded. Biasing arms 250 may comprise a plurality of biasing bushings attached to each circular plate 230 to bias video probe 200 against the interior diameter of pieces 10 to be welded into which video probe pig 220 is inserted. Biasing may also be accomplished by making the attachment of biasing bushings to circular plates 230 adjustable at circular plates 230, by use of springs or their equivalent, by use of flexible biasing wheels, or any other biasing method.

Video probe 200 is in communication with and may be directly or indirectly connected to monitoring device 260, which can be a color or black and white video monitor. Video probe 200 is capable of providing sufficient information to measuring device 261, which may be a personal computer, to allow measuring device 261 to calculate dimensional measurements of the material on which video camera 210 is focused. In a preferred embodiment, monitoring device 260 displays one or more cursors (not shown in FIG. 10) where the cursors are controlled by measuring device 261 and manipulated by controls such as joysticks connected to measuring device 261. The cursors indicate to measuring device 261 points along the interior of piece 10 which aid in calculating reentry angle 47, intrusion point 45, and deepest penetration point 46 (all not shown in FIG. 10). Video camera 210 video output may also be captured onto video recording device 262 which can be any device capable of capturing video for later playback including video tape or hard disk.

Communication to and from video camera 210 may be via cable 251 or via other communication methods such as radio frequency, optics, or infrared methods provided they are capable of communicating the appropriate video and/or control signals. As video probe 200 can be moved coaxially about its central axis as well as circumferentially about its central axis within pieces 10 to be welded, video probe 200 can allow a full circumferential inspection of the interior of pieces 10 to be welded especially at root bead weld 40.

Communication between video camera 210 and the exterior of pieces 10 to be welded is provided by cable 251 capable of communication with video camera 210 including control and video signals, although alternate communication conduits other than cable 251 such as radio frequency, optics, or infrared may be used provided they are capable of sending the appropriate control signals to video camera 210 as well as receiving the appropriate control and video information from video camera 210.

In a preferred embodiment, cable 251 is a fiber optic cable attached to video camera 210 and passes through an aperture in circular plate 230 to exit pieces 10 to be welded.

Figure 11:
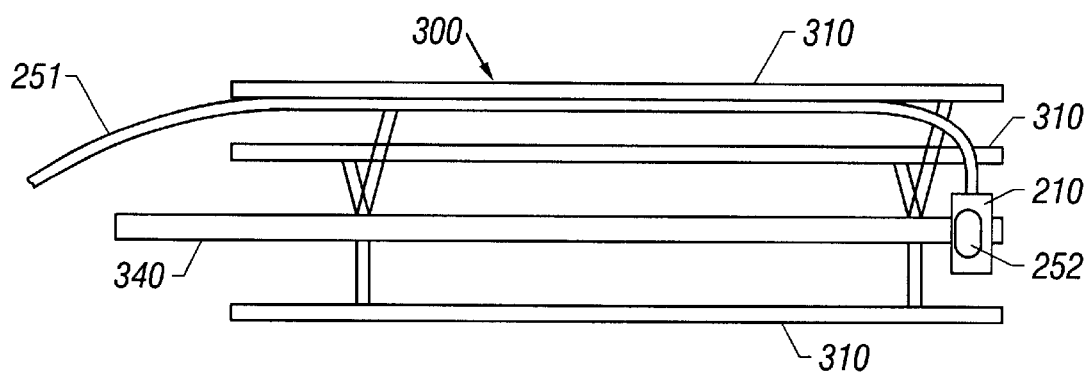
FIG. 11 is a perspective view of an alternate video probe configuration.

Referring now to FIG. 11, a perspective view of an alternate video probe configuration, frame assembly 300 may be used for video probe 200 in an alternate embodiment. In the alternative embodiment, frame assembly 300 is comprised of two or more frame assembly arms 310 connected to central axis lance 340. Video camera 210 is attached to central axis lance 340 such that the field of vision of video camera 210 is not obscured by any of frame assembly arms 310. As in the embodiment described above, video camera 210 is mounted perpendicular to the inner surface of piece 10 to be inspected along a perpendicular radius defined from the center of piece 10 to root bead weld 40. Frame assembly arms 310 may be adjustable about central axis lance 340 to allow biasing of frame assembly arms 310 against the interior of pieces 10 to be welded.

Frame assembly 300 can be manipulated manually or automatically to maneuver frame assembly 300 through the interior of pieces 10 to be welded. Additionally, frame assembly 300 can be incrementally rotated manually or automatically about its center axis as defined by central axis lance 340. In this alternative preferred embodiment, fiber optic cable 251 is attached to video camera 210 and may be attached to one of frame assembly arms 310 to exit pieces 10 to be welded.

Referring back now to FIG. 2, in a preferred embodiment pieces 10 to be welded are tubulars used to fabricate a riser mother joint. Tubulars 10a and 10b are placed onto a series of conveyers 100. After beveling, tubular 10a and tubular 10b are maneuvered to welding station 30, stabbed with lineup clamp 20 (not shown in FIG. 2), and then welded in accordance with method of the present invention. In a similar fashion, those skilled in the art will understand that a box and a pin can be welded onto tubulars 10a and 10b in similar fashion. When tubular 10a and tubular 10b welding operations are completed, the welds are inspected according to the visual testing method of present invention. Additional testing may also occur.

As those skilled in the art will also appreciate, three separate sets of welding stations 30 and lineup clamps 20 can be used to facilitate creation of strings of tubulars in accordance with the present invention, including mother riser joints which consist of two tubulars welded at a central point, a pipe and box being welded at the other ends. For example, two independent beveling stations 50 could more-or-less simultaneously bevel two tubulars which, after beveling, would be welded at two separate welding stations 30, one tubular to a pin, and the other tubular to a box. These two welded tubulars could then be conveyed to a third beveling station 50 where their remaining non-beveled ends would be beveled, and from there to a third welding station 30 where the two welded tubulars would be welded into a mother riser joint.

Using the various apparatuses described herein above, pieces 10 to be welded are fabricated by the present invention's method as follows.

Referring generally to FIG. 2, piece 10 to be welded, having at least one open end, is positioned at beveling machine 50. In one embodiment, one end is beveled at a time although alternate embodiments may allow beveling of both ends simultaneously. The end to be beveled is beveled into the present invention's half-concave channel, or modified sans serif "J", shown generally in FIG. 4 and described herein above. The beveling process is repeated for each other piece 10 to be welded at its respective ends to be welded.

Two beveled pieces 10 to be welded, e.g., a beveled box end and a beveled pipe or two beveled tubulars, may then be placed into rotatable assembly carrier 70 such that beveled ends 11 and 12 are situated immediately opposite each other. Lineup clamp 20 (not shown in FIG. 2) is then stabbed into pieces 10 to be welded at their beveled ends 11 and 12. The residual magnetism of pieces 10a and 10b may then measured, and pieces 10a and 10b may be degaussed to reduce the magnetism to an acceptable maximum level which will not interfere with the welding, typically to less than seven gauss. Degaussing may be accomplished by any degaussing method, including the use of a degaussing coil slipped onto piece 10 at or near its beveled edge 11 or 12. If a degaussing coil is used, degaussing may be accomplished while piece 10 is rotating axially within the degaussing coil. A magnetism reading should be taken immediately after lineup clamp 20 has acceptably aligned pieces 10 to insure that residual magnetism has not increased above the acceptable maximum level. Welding should commence immediately after the degaussing.

Referring to FIG. 2 and FIG. 6, after degaussing, biaser 22 securely biases lineup clamp 20 against the inner wall of pieces 10, thus aligning pieces 10 along a common, central, longitudinal axis defined by lineup clamp's 20 housing axis 26. If pairs of sleeves 21 are used, sleeves 21a and 21b then approach each other coaxially about lineup clamp's 20 cylindrical axis 26, axially aligning beveled ends 11 and 12. In one embodiment, sleeves 21a and 21b abut beveled ends 11 and 12 into a tight seam along welding junction 13 such that overlap, i.e., noncongruent matches, of beveled edges 11 and 12 is minimized. Welding junction 13 is then inspected and must be in contact at all points along welding junction 13. The inspection may be visual. If welding junction 13 is not in contact at all points along welding channel 17, lineup clamp 20 must be disengaged and pieces 10 to be welded realigned for the best fit, where best fit limits axial misalignment to a acceptable maximum tolerance. In the preferred embodiment, the maximum tolerance may be as great as 1/16". However, alternative embodiments can increase the tolerance and use a greater land extension 15 to relax the maximum misalignment.

When beveled ends 11 and 12 are properly aligned at welding junction 13 and the alignment is satisfactory, the interior area of pieces 10 purge dam 23c may be flooded with purge gas through inlet port 25, continuously purging and replacing the interior air with the purge gas while allowing the atmospheric gases and the purge flood gases to escape through gas escape ports 230.

Referring again to FIG. 8 and FIG. 9, welding device 31 is positioned proximate to welding junction 13 in welding channel 17, and beveled ends 11 and 12 are welded together by welding device 31 in a continuous single pass to create root bead 40. This initial weld may be accomplished by a synchronous, continuous rotation of pieces 10 in rotatable assembly carrier 70 where the movement of pieces 10 are axially synchronized by the biasing action of biaser 22. A feedback loop mechanism may be used to maintain the rotation of the pieces 10 in rotatable assembly carrier 70 at a constant rotational speed. A second feedback loop mechanism connected to attachment arm 33 maintains welding device 31 at a constant radial offset from welding junction 13, thus providing radial offset adjustments in real time to accommodate eccentricities in welding junction's 13 circular dimension at welding channel 17.

In one implementation, at its deepest penetration point 46, as measured from the inner diameter of the pieces 10, root bead 40 protrudes no further than a maximum allowable depth, typically no more than 0.0625", into the interior of pieces 10 at every point of root bead 40 at the interior of pieces 10 at welding junction 13. Additionally, reentry angle 47, as measured by and formed from intrusion point 45 in pieces 10 immediately adjacent to root bead 40 to deepest penetration point 46 of root bead 40 in the interior of pieces 10 is at least 130°, accomplished by using the rotation speed of rotatable assembly carrier 70 and the constant, radial offset of welding device 31 as monitored and controlled by the feedback loop controlling attachment arm 33 of welding device 31. In a preferred embodiment, reentry angle 47 is at least 150°. Reentry angle 47 is maintained in this welding process even if the thicknesses of welding junctions 13 of the two pieces 10 to be welded are offset, i.e., do not match perfectly due to differences in their ovality.

After welding device 31 completes the welding pass that creates root bead 40, biasers 22 are released and lineup clamp 20 removed. The interior of pieces 10 and root bead weld 40 may then be inspected in accordance with the testing method described herein below. Each root bead weld 40 may also be inspected completely about the outer diameter of pieces 10 to be welded. Welding device 31 is then removed from being in proximity with welding junction 13, welding device 32 maneuvered proximate to welding channel 17 via attachment arm 33, and then welding device 32 lowered into position proximate to welding channel 17. Welding device 32 makes one or more passes creating fill/cap welds 43, where each subsequent pass is offset from the prior fill/cap weld 43 pass. This creates a series of oscillating fill/cap welds 43 in welding channel 17 such that each succeeding fill/cap weld 43 partially overlaps the prior fill/cap weld 43, filling the welding channel 17 and capping the prior fill/cap welds 43.

The inner surfaces of pieces 10 may be inspected and tested to insure compliance of the welds with minimum and maximum accepted tolerances. Numerous testing methods can be used, including visual methods. The present invention's preferred visual method is a video measuring and inspection method which utilizes video probe 200.

Referring again to FIG. 9 and FIG. 10, after pieces 10 to be welded have been welded and all oscillation passes at welding junctions 13 have been completed, the present invention's visual testing method includes inserting video probe 200 into pieces 10 to inspect root bead weld 40 from the inside of pieces 10. Video probe 200 is stabbed into pieces 10 and positioned proximate to a first point immediately adjacent to the interior protrusion of root bead 40 to be inspected.

Video probe 200 is then maneuvered manually or automatically until a second point is located which defines the deepest penetration point 46 into the interior of welding junction 13 by root bead 40. As in the preferred embodiment, control software executing within computer 261 may be used to measure the offsets from video camera 210 to these two points and calculate reentry angle 47. Video probe 200 may then be incrementally rotated circumferentially to repeat the process of determining reentry angle 47 and deepest penetration point 46 until the entire interior weld has been examined.

In addition to the interior inspections, the structural integrity of the welds can be inspected using traditional testing methods such as magnetic particle examination, ultrasonic examination, and radiographic examination.

It can be seen from the preceding description that an improved welding apparatus and method, capable of creating single-sided girth welds has been described and provided.

It is noted that the embodiment of the single side girth welding apparatus and method described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method for welding two pieces having an conduit together from the exterior of the pieces, the method comprising the steps of:

beveling an end of a first piece into a modified "J" shape;

beveling an end of a second piece into a modified "J" shape;

aligning said first piece beveled end and said second piece beveled end co-axially along the longitudinal axis of said pieces to form a welding channel;

creating a root weld pass via a first welding device within said welding channel having a reentry angle exceeding 130 degrees on the inside diameter of said pieces, and weld reinforcement of less than 0.1000 inches;

maintaining said first welding device at a substantially constant offset from said welding channel while creating said root weld pass;

depositing weld metal via a second welding device atop said root pass; and measuring said weld reentry angle and said weld reinforcement from the interior of said pieces.

2. The method of claim 1, wherein:

said modified "J" shape includes a first section running from an end of said piece and substantially parallel to an inner surface thereof and a second section extending from said first section to an outer surface of said piece.

3. The method of claim 2, wherein:

said first welding device is a gas tungsten arc welding device.

4. The method of claim 2, wherein:

said first welding device is a gas tungsten arc welding device; and said second welding device is a gas metal arc welding device.

5. The method of claim 2, wherein:

said weld reentry angle and said weld reinforcement are measured from the interior of said pieces via a video camera connected to a carrier insertable into said pieces, said camera functionally connected to a video probe system for viewing an image from exterior of said pieces, and connected to a measuring system.

6. The method of claim 2, wherein:

said reentry angle of said root weld pass exceeds 150 degrees; and said weld reinforcement is less than 0.0625 inches.

7. The method of claim 1, wherein:

said pieces are aligned via a lineup clamp insertable within the interior of said pieces having a housing, a first dam disposed at a first end of said housing, a second dam disposed at a second end of said housing, a purge chamber defined between said first and said second dam, and a bushing disposed about said housing between said first dam and said second dam, and shoes extending laterally outward from said housing for gripping said pieces.

8. The method of claim 7, wherein:

said pieces are aligned via a lineup clamp insertable within the interior of said pieces having a housing, a first dam disposed at a first end of said housing, a second dam disposed at a second end of said housing, a purge chamber defined between said first and said second dam, and a bushing disposed about said housing between said first dam and said second dam, and shoes extending laterally outward from said housing for gripping said pieces.

9. The method of claim 8, wherein:

said first welding device is a gas tungsten arc welding device; and said second welding device is a gas metal arc welding device.

10. The method of claim 8, wherein:

said weld reentry angle and said weld reinforcement are measured from the interior of said pieces via a video camera connected to a carrier insertable into said pieces, said camera functionally connected to a video probe system for viewing an image from exterior of said pieces, and connected to a measuring system.

11. The method of claim 8, wherein:

said reentry angle of said root weld pass exceeds 150 degrees; and said weld reinforcement is less than 0.0625 inches.

12. The method of claim 7, wherein:

said first welding device is a gas tungsten arc welding device; and said second welding device is a gas metal arc welding device.

13. The method of claim 7, wherein:

said reentry angle of said root weld pass exceeds 150 degrees; and said weld reinforcement is less than 0.0625 inches.

14. The method of claim 7, wherein:

said first welding device is a gas tungsten arc welding device.

15. The method of claim 1, wherein:

said second welding device is a gas metal arc welding device.

16. The method of claim 1, wherein:

said first welding device is a gas tungsten arc welding device; and said second welding device is a gas metal arc welding device.

17. The method of claim 16, wherein:

said weld reentry angle and said weld reinforcement are measured from the interior of said pieces via a video camera connected to a carrier insertable into said pieces, said camera functionally connected to a video probe system for viewing an image from exterior of said pieces, and connected to a measuring system.

18. The method of claim 1, wherein:

said weld reentry angle and said weld reinforcement are measured from the interior of said pieces via a video camera connected to a carrier insertable into said pieces, said camera functionally connected to a video probe system for viewing an image from exterior of said pieces, and connected to a measuring system.

19. The method of claim 18, wherein:

said reentry angle of said root weld pass exceeds 150 degrees; and said weld reinforcement is less than 0.0625 inches.

20. The method of claim 1, wherein:

said reentry angle of said root weld pass exceeds 150 degrees; and said weld reinforcement is less than 0.0625 inches.

21. A method for welding two pieces having an conduit together from the exterior of the pieces, the method comprising the steps of:

beveling an end of a first piece into a shape having a first section running from an end of said piece and substantially parallel to an inner surface thereof and a second section extending from said first section to an outer surface of said piece;

beveling an end of a second piece into a shape having a first section running from an end of said piece and substantially parallel to an inner surface thereof and a second section extending from said first section to an outer surface of said piece;

aligning said first piece beveled end and said second piece beveled end co-axially along the longitudinal axis of said pieces to form a welding channel;

creating a root weld pass via a gas tungsten arc welding device within said welding channel having a reentry angle exceeding 130 degrees on the inside diameter of said pieces, and weld reinforcement of less than 0.1000 inches;

maintaining said gas tungsten arc welding device at a substantially constant offset from said welding channel while creating said root weld pass;

depositing weld metal via a gas metal arc welding device atop said root pass; and measuring said weld reentry angle and said weld reinforcement from the interior of said pieces via a video camera connected to a carrier insertable into said pieces, said camera functionally connected to a video probe system for viewing an image from exterior of said pieces, and connected to a measuring system.

22. The method of claim 21, wherein:

said pieces are aligned via a lineup clamp insertable within the interior of said pieces having a housing, a first dam disposed at a first end of said housing, a second dam disposed at a second end of said housing, a purge chamber defined between said first and said second dam, and a bushing disposed about said housing between said first dam and said second dam, and shoes extending laterally outward from said housing for gripping said pieces.

23. The method of claim 22, wherein:

said reentry angle of said root weld pass exceeds 150 degrees; and said weld reinforcement is less than 0.0625 inches.

24. The method of claim 21, wherein:

said reentry angle of said root weld pass exceeds 150 degrees; and said weld reinforcement is less than 0.0625 inches.

25. A method for welding two pieces having an conduit together from the exterior of the pieces, the method comprising the steps of:

beveling an end of a first piece into a shape having a first section running from an end of said piece and substantially parallel to an inner surface thereof and a second section extending from said first section to an outer surface of said piece;

beveling an end of a second piece into a shape having a first section running from an end of said piece and substantially parallel to an inner surface thereof and a second section extending from said first section to an outer surface of said piece;

aligning said first piece beveled end and said second piece beveled end co-axially along the longitudinal axis of said pieces to form a welding channel via a lineup clamp insertable within the interior of said pieces having a housing, a first dam disposed at a first end of said housing, a second dam disposed at a second end of said housing, a purge chamber defined between said first and said second dam, and a bushing disposed about said housing between said first dam and said second dam, and shoes extending laterally outward from said housing for gripping said pieces;

creating a root weld pass via a gas tungsten arc welding device within said welding channel having a reentry angle exceeding 150 degrees on the inside diameter of said pieces, and weld reinforcement of less than inches;

maintaining said gas tungsten arc welding device at a substantially constant offset from said welding channel while creating said root weld pass;

depositing weld metal via a gas metal arc welding device atop said root pass; and measuring said weld reentry angle and said weld reinforcement from the interior of said pieces via a video camera connected to a carrier insertable into said pieces, said camera functionally connected to a video probe system for viewing an image from exterior of said pieces, and connected to a measuring system.

* * * * *

UNITED STATES PATENT AND TRADEMARK OFFICE
CERTIFICATE OF CORRECTION

PATENT NO. : 6,392,193 B1  
DATED : May 21, 2002  
INVENTOR(S) : Pradeepkumar Krishnan Mallenahalli and Dale J. Castille It is certified that error appears in the above-identified patent and that said Letters Patent is hereby corrected as shown below:

<u>Title page,</u>
Item [75], name of first inventor should be:
-- Pradeepkumar Krishnan Mallenahalli --

Signed and Sealed this

Seventeenth Day of December, 2002

JAMES E. ROGAN
*Director of the United States Patent and Trademark Office*